Sept. 23, 1947.  E. L. STREMPEL ET AL  2,427,752
CONCENTRIC LINE LAMP FOR MEASURING HIGH-FREQUENCY POWER
Filed Sept. 2, 1943
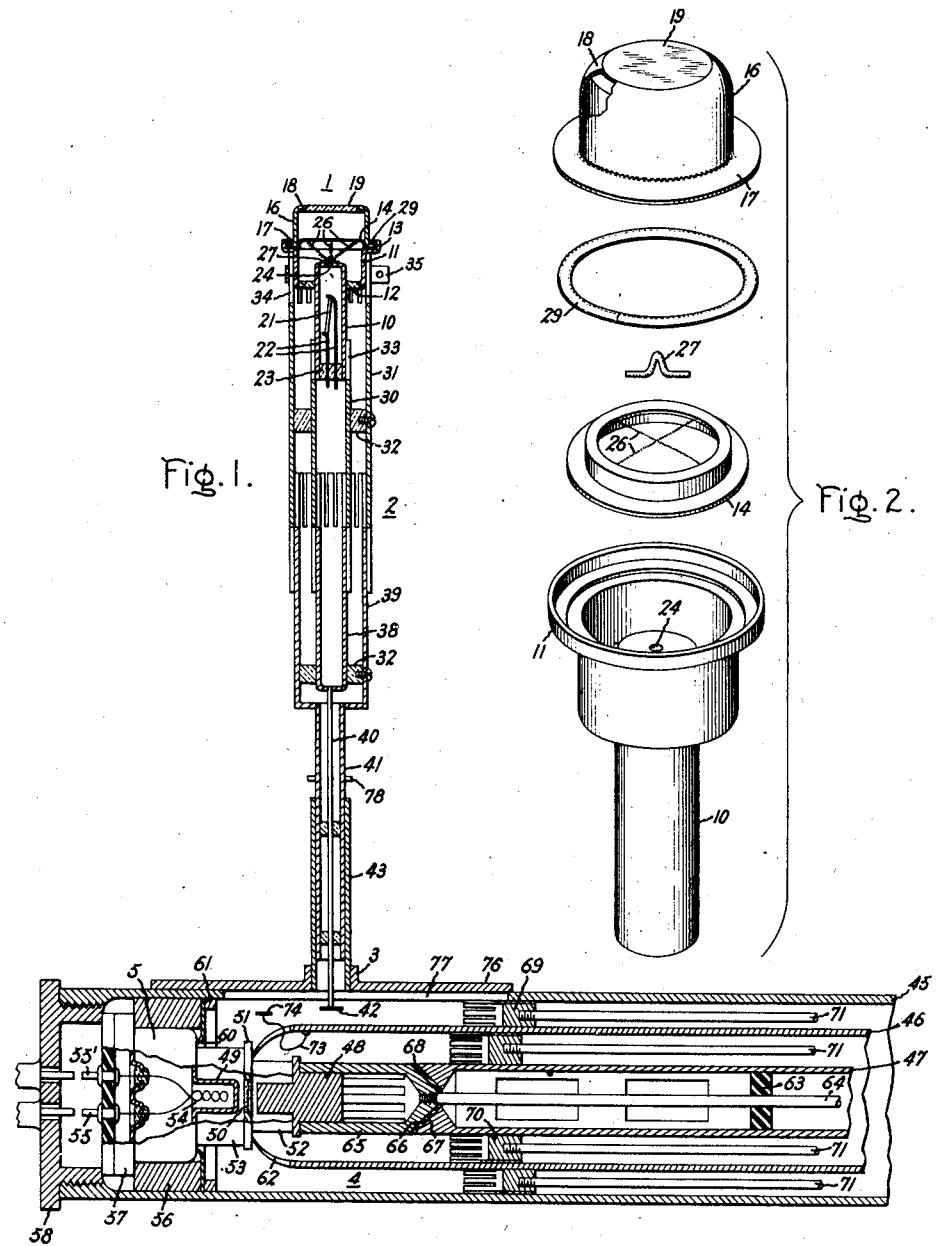
Inventors:
Edward L. Strempel,
James E. Beggs,
Harry W. A. Chalberg,
by Harry E. Dunham
Their Attorney.

Patented Sept. 23, 1947

2,427,752

UNITED STATES PATENT OFFICE 2,427,752

CONCENTRIC LINE LAMP FOR MEASURING HIGH-FREQUENCY POWER

Edward L. Strempel, James E. Beggs, and Harry W. A. Chalberg, Scotia, N. Y., assignors to General Electric Company, a corporation of New York Application September 2, 1943, Serial No. 501,004

11 Claims. (Cl. 315—32)

1

Our invention relates to space-resonant systems, such as space-resonant oscillators, and in particular to apparatus for measuring the power of such space-resonant systems.

It is an object of our invention to provide a new and improved high frequency power measuring apparatus.

It is another object of our invention to provide a new and improved indicating lamp for measuring ultra high frequency power.

It is a still further object of our invention to provide a new and improved indicating lamp for measuring ultra high frequency power and having low losses in all parts of the lamps other than the filaments at ultra high frequencies.

It is still another object of our invention to provide a new and improved load indicating lamp for measuring the power in a space-resonant cavity in which a getter is employed to maintain a high vacuum within said lamp, the getter being located in a region free from the ultra high frequency fields.

One of the features of our invention is the constructing of a load indicating lamp for ultra high frequency power measurements as a section of concentric transmission line in which a filament is connected between the inner and outer conductors of the section of the transmission line and a glass window is sealed across the outer conductor of the line to provide means for observing the filament, the region about the filament being highly evacuated to prevent oxidation of the filament and voltage breakdown within the lamp.

Another feature of our invention is the provision of a load lamp for use at ultra high frequencies which may be easily attached to a coaxial line suitably coupled to a high frequency power source without introducing severe reflections in the coaxial line due to any impedance mismatching.

For a better understanding of our invention, reference may be had to the following description taken in connection with the accompanying drawing and its scope will be pointed out in the appended claims. Fig. 1 of the accompanying drawing illustrates an embodiment of our invention as applied to a space-resonant oscillator wherein an indicating lamp is connected to the space-resonant oscillator through a section of concentric transmission line of adjustable length, and Fig. 2 is an exploded view of the indicating lamp of our invention.

With reference to Figs. 1 and 2 of the drawing, jointly, there is illustrated an indicating lamp 1

2 attached to one end of a concentric transmission line 2 of adjustable length, the other end of the transmission line 2 being connected to a traveling detector 3 used in conjunction with a space-resonant cavity 4 employed in conjunction with an electric discharge device 5.

The indicating lamp 1 comprises a centrally disposed cylindrical conductive member 10, around the upper end of which is concentrically located a metal cylinder 11, the metal cylinder being held in spaced relation by a disk 12 of insulating material, such as glass, hermetically sealed to both the members 10 and 11. The upper end of the metallic cylinder 11 has an outwardly directed flange 13 on which is located an annular filament support 14. A second metallic cylinder or sleeve 16, having both an outwardly directed flange 17 at its lower end and an inwardly directed flange 18 at its upper end, is placed above the metal cylinder or sleeve 11 with the flange 17 opposed to the flange 13 and the ring 14 located between these flanges. Hermetically sealed across the inwardly directed flange 18 of sleeve 16 is a glass window 19.

Located within the hollow cylinder 10 is a getter 21, to the opposite ends of which are attached conductors 22, these conductors passing through a glass disk 23 hermetically sealing the bottom end of cylinder 10. A small hole 24 at the upper end of metallic cylinder 10 provides communication with the upper part of lamp 1 so that the getter 21 may maintain a high vacuum within the lamp 1. Supported from the ring 14 are a plurality of coiled tungsten filaments 26 welded at their ends to the ring 14. A small hook 27 engages the filaments 26 at their center points and is welded to the upper end of tube 10 conductively to connect the filaments 26 between the cylinder 10 and the ring 14 and to draw the filaments down tightly so that they extend radially outwardly from the cylinder 10 to the ring 14.

In assembling the lamp 1, cylinder 10 and sleeve 11 are held in spaced relation and the glass disk 12 is hermetically sealed between these members. The ring 14 is then placed in position on flange 13 and the filaments 26 are drawn down to the upper end of cylinder 10 by means of the hook 27, after which, this hook is welded to this end of cylinder 10. After the glass window has been sealed across the end of sleeve 16, this sleeve is placed in position with its flange 17 opposite flange 13 and a ring of solder 29 is placed around this flange. The tube is then evacuated and the ring of solder 29 is melted, preferably indirectly by means of high frequency currents, to seal the junction of the upper and lower sections of the lamp. Thereafter, current is passed through the conductors 22 to flash getter 21, further reducing the gas pressure within the lamp.

The metallic cylinder 10, the sleeves 11 and 16, and the ring 14 preferably are formed of copper- or silver-plated iron. The glass used for the window 19 and the seal 12 preferably is so constituted that it has a temperature coefficient of expansion substantially equal to that of the metallic members to which it is adjoined. Such a glass may contain, for example, about 45 per cent $SiO_2$, 14 per cent $K_2O$, 6 per cent $Na_2O$, 30 per cent PbO and 5 per cent $CaF_2$.

The transmission line 2 of adjustable length comprises tubular inner and outer conductors 30, 31, concentrically spaced by means of insulators 32, and provided respectively with slotted fingers 33, 34 at their upper ends. The upper ends of the conductors 30, 31 are displaced longitudinally a sufficient amount that when the lamp 1 is inserted in the upper end of the tube, the fingers 33 engage the outer surface of the cylinder 10, while the fingers 34 conductively engage the outer surface of sleeve 11. A clamping ring 35 may be employed to draw the fingers 34 tightly about the sleeve 11 to hold the lamp firmly in position. Conductors 31, 32, at their lower ends, likewise have slotted fingers which engage the outer surface of the upper ends of inner and outer conductors 38, 39 of a lower section of the concentric transmission line. The concentric transmission line comprising conductors 38, 39 may be connected at its lowermost end to another section of transmission line of reduced diameter and comprising inner conductor 40 and outer conductor 41, the inner conductor 40 terminating at its lowermost end in a plate 42 which functions as one plate of a capacity probe extending within the space-resonant cavity 4. The outer conductor 41 is adjustable in length to vary the position of plate 42 within cavity 4, having surrounding it at its lower end a conductive sleeve 43.

With reference now to the resonant cavity 4 and the electric discharge device 5, the former comprises a series of three concentric and mutually telescoped conductors 45, 46, 47 suitably consisting of brass or copper and providing, in effect, a pair of concentric transmission line sections, each of which by proper termination functions as a space-resonant cavity having a particular resonant frequency. Inserted into the left-hand end of the cavity thus formed is the discharge device comprising an anode 48, a cathode 49, and a grid or control electrode 50, these electrodes being arranged in end-to-end relation and the grid 50 being supported from a disk 51. A cylinder 52 of insulating material, such as glass, sealed between anode 48 and disk 50 serves to maintain these electrodes in fixed spaced relation. A similar glass cylinder 53 is utilized to maintain disk 51 and cathode 49 in spaced relation, the glass disks 52, 53 also serving to define a sealed region about these electrodes of the discharge device. Cathode 49 is heated by filament 54, supplied with current over conductors 55, 55'. The discharge device, when inserted between the previously mentioned cylinders, is abutted against a metallic block 56 secured to the inner surface of cylinder 45, the base 57 of the device being clamped against this block by means of a nut 58 engaging threads on the inner surface of cylinder 45.

A plurality of contact fingers 60 are clamped between metal block 56 and a ring 61 soldered to the inner surface of cylinder 45 to contact the outer surface of the cathode structure. A similar set of spring-like contact fingers 62 at the lower end of cylinder 46 engage the ring 51. These contact fingers 60, 62, conductively connected with the outer cylinder 45 and the intermediate cylinder 46, cooperate with these cylinders to define a cathode-grid space-resonant cavity. Supported within the cylinder 47 by means of insulator 63 is a rod 64 whose function is to supply unidirectional currents to anode 48 and which carries at its left-hand end a metallic member 65 having a plurality of slotted fingers which engage the outer surface of the anode 48. The member 65 at its right-hand end has a bevelled surface 66 which is held in spaced relation with a similarly bevelled end 67 of cylinder 47 by a layer 68 of any suitable insulation, such as mica, the bevelled surfaces 66 and 67 serving capacitively to couple the anode to the conductor 47 for alternating currents, the insulation between these surfaces serving to block the transmission of unidirectional currents between these members. So constructed, the inner conductor 47, the member 65, and the intermediate conductor 46 define a grid-anode cavity.

Means is provided in connection with the space-resonant system for tuning or controlling the natural resonant frequency of the system. This means may take the form of an annular plunger 69 which is positionable or slidable along the inner surface of cylinder 44 and the outer surface of cylinder 46 and an annular plunger 70 which is positionable or slidable along the inner surface of cylinder 46 and the outer surface of cylinder 47. These plungers may be positioned by any suitable mechanical expedient, such as by rods 71. The anode-grid and grid-cathode cavities may be coupled by any suitable coupling means, one form of which may be the loop 73 within the anode-grid cavity and having one of its ends attached to the inner surface of cylinder 46. The other end of the loop 73 extends into the cathode-grid cavity and terminates in a plate 74 to provide capacitive coupling with the conductive walls defining this cavity.

Upon impressing suitable unidirectional voltage across the anode 48 and the cathode 49, high frequency oscillations are developed. The occurrence of such oscillations depends, of course, upon the assumption that proper resonance conditions are provided by the tuning of the respective cavities by means of the plungers 69, 70 and that suitable feed back between the cavities is provided between loop 73 and plate 74. In order to determine points of high electric or high magnetic field within the cathode-grid cavity, as well as to determine a point at which maximum coupling for power extraction may be obtained, the traveling detector 3 is provided and comprises the plate or probe 42 mounted on the end of inner conductor 40 of the previously described concentric transmission line, which transmission line is supported on a curved plate 76 overlying a longitudinal slot 77 cut in the cylinder 45, the plate 76 being movable along this slot so that the probe 42 may be moved to any desired longitudinal position within the cathode-grid cavity. By means of the sliding connections between outer conductors 41 and 43, the probe 42 may be moved vertically to any desired vertical position within this cavity, a stop 78 attached to the outer surface of outer conductor 41 limiting the downward motion of the plate 42 within the cathode-grid cavity. Such a traveling probe affords means for determining a point of optimum coupling for extracting power from a space-resonant system. Probe 42 and inner conductors 40, 38, and 33 serve as one conductor supplying high frequency currents to the filaments 26 within lamp 1 and the outer conductors of the concentric line sections serve conductively to connect the other terminals to the cylinder 45.

In operation, the plate 76 is moved along the outer surface of cylinder 45 to vary the longitudinal position of probe 42 within the cavity. Conductor 41 is adjusted to vary the vertical position of this plate within the cavity until a point of maximum brilliance of the filaments 26 is obtained, such a condition indicating that a point of optimum coupling to the cavity has been found. For purposes of determining the amount of this power, the brilliance of the lamp under such conditions may be compared to the brilliance of the lamp when operated with unidirectional currents, such comparison being made optically or by means of suitable instruments, such as a photocell and meters.

Fig. 2 is an exploded view of the coaxial load lamp of our invention and shows the component parts of the lamp prior to assembly. Thus, preferably, the sealed cylinder 10 containing the getter material is sealed by means of the glass disk 12 (shown in Fig. 1) to cylinder 11 to form a unitary structure. Ring 14 has the filaments 26 welded thereacross prior to final assembly. Also, the window 19 is sealed across cylinder 16.

It is thus seen that our invention provides an improved power measuring device for ultra high frequency systems in which the power within a space-resonant cavity may be determined to assure that more than certain minimum power is being supplied. The device, of course, may be used with any high frequency system to indicate the presence of oscillations within the system and to determine the maximum power obtainable from that system.

Although, in the above-described embodiments of the invention, particular structural features are represented as applied to the space-resonant system used as an oscillator, it is readily apparent that the invention which is provided may be applied with equal facility to any high frequency power source when a proper coupling system is arranged between the source and the load lamp. Similarly, certain modifications, such as the use of different types of couplings between cavities and other types of connections between the concentric line indicating lamp and space-resonant system may be employed.

While we have shown and described our invention as applied to a particular system embodying the devices diagrammatically shown, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. A lamp for ultra high frequency power measurements comprising, a section of concentric transmission line having a tubular outer conductor and a cylindrical inner conductor, one end of said inner conductor lying wholly within said outer conductor, an insulating disk sealed between said conductors at a point spaced longitudinally from said end to maintain said conductors in concentric alignment, a glass window spaced from said end and sealed across said outer conductor forming with said outer conductor and said disk a vacuum-tight enclosure about said end, and a filament connected between said end of said inner conductor and said outer conductor within said enclosure.

2. A lamp for ultra high frequency power measurements comprising, a metallic cylinder, a metallic sleeve concentrically surrounding a portion of said cylinder to form therewith a section of concentric transmission line, a glass disk hermetically sealed between said sleeve and said cylinder at a point spaced longitudinally from one end of said cylinder, a glass window in spaced relation with said end and sealed across said sleeve forming with said sleeve and said disk a sealed enclosure about said end of said cylinder, the glass of said disk having a low high frequency dielectric loss, and a filament extending between said end of said cylinder and said sleeve within said enclosure.

3. A lamp for ultra high frequency power measurements comprising, a metallic cylinder, a metallic sleeve concentrically surrounding a portion of said cylinder to form therewith a section of concentric transmission line, a glass disk hermetically sealed between said sleeve and said cylinder at a point spaced longitudinally from one end of said cylinder, a glass window in spaced relation with said end and sealed across said sleeve forming with said sleeve and said disk a sealed enclosure about said end of said cylinder, the glass of said disk having a low high frequency dielectric loss, and a plurality of radially extending filaments connected between said cylinder at said end and said sleeve within said enclosure.

4. A lamp for ultra high frequency power measurements comprising, a metallic cylinder, a metallic sleeve concentrically surrounding a portion of said cylinder and extending longitudinally beyond the end thereof and forming therewith a section of concentric transmission line, a glass disk hermetically sealed between said cylinder and said sleeve at one end of said sleeve, said sleeve having an outward flange at its other end, a second metallic sleeve having an inwardly directed flange at one of its ends and an outwardly directed flange at its other end, a glass window hermetically sealed across said inwardly directed flange, said outwardly directed flanges of said first and second sleeves being in opposed relation and hermetically sealed, and a plurality of radial filaments connected between said flanges and said end of said cylinder.

5. A lamp for ultra high frequency power measurements comprising, a metallic cylinder, a metallic sleeve concentrically surrounding a portion of said cylinder and extending longitudinally beyond the end thereof and forming therewith a section of concentric transmission line, a glass disk hermetically sealed between said cylinder and said sleeve at one end of said sleeve, said sleeve having an outward flange at its other end, a second metallic sleeve having an inwardly directed flange at one of its ends and an outwardly directed flange at its other end, a glass window hermetically sealed across said inwardly directed flange, a metallic ring supported between the outwardly directed flanges of said first and second sleeves, said flanges being hermetically sealed thereabout, and a filament supported between said ring and said end of said metallic cylinder.

6. An apparatus for measuring radio frequency power comprising, a tubular outer conductor and an inner conductor substantially coaxially aligned with said outer conductor, insulating means supporting said conductors in spaced relation, a transparent window sealed across said outer conductor and forming with said outer conductor and said insulating means a vacuum-tight enclosure between said conductors, a filament conductively connected between said conductors within said enclosure, and coupling means including concentric transmission line components electrically continuous with said inner and outer conductors for conducting radio frequency power to said enclosure.

7. A lamp for ultra high frequency power measurements comprising a lamp enclosure, a tubular metal part forming a portion of the lateral wall of the lamp enclosure and adapted to serve as contact surface for a cooperating cylindrical high frequency conductor, a viewing window hermetically closing one end of said tubular metal part, a second metal part extending coaxially within said tubular metal part at the end thereof remote from said window, insulating means extending between said metal parts and completing the lamp enclosure, said second metal part having a portion thereof extending outside the lamp enclosure and shaped to serve as a contact surface for a second cylindrical high frequency conductor, and a filament within the lamp enclosure connected between said second metal part and said first metal part.

8. A lamp for high frequency power measurements comprising a lamp enclosure, a hollow metal cylinder forming a portion of the lateral wall of the lamp enclosure and adapted to serve as a contact surface for a cooperating cylindrical high frequency conductor, a viewing window hermetically closing one end of said cylinder, a metal part extending coaxially within said hollow cylinder at the end thereof remote from said window, means including a body of glass extending between said cylinder and said metal part and completing the lamp enclosure, said metal part having a cylindrical portion thereof extending outside the lamp enclosure and appreciably beyond the extremity of said cylinder and providing a contact surface for a second cylindrical high frequency conductor, and a filament connected between said cylinder and said metal part within said enclosure.

9. Apparatus for measuring radio frequency power comprising a hollow outer conductor and an inner conductor substantially coaxially aligned with said outer conductor, insulating means extending between said conductors, a transparent viewing window sealed to said outer conductor and forming therewith and with said insulating means a vacuum-tight enclosure between said conductors, means within said enclosure for producing a visible power indication upon application of potential between said conductors, and coupling means including concentric transmission line components electrically continuous with said conductors for conducting high frequency power to said enclosure.

10. Apparatus for measuring high frequency power comprising a tubular outer conductor and an inner conductor substantially coaxially aligned with said outer conductor, insulating means supporting said conductors in spaced relation, a transparent window forming with said outer conductor and said insulating means a vacuum-tight enclosure between said conductors, a filament conductively connected between said conductors within said enclosure, a concentric transmission line structure having its respective components electrically continuous with said conductors, and coupling means at the extremity of said concentric transmission line structure for feeding high frequency power to said transmission line and thence to said enclosure.

11. Apparatus for measuring high frequency power comprising a tubular outer conductor and an inner conductor substantially coaxially aligned with said outer conductor, insulating means extending between said conductors, a transparent viewing window sealed across said outer conductor and forming with said insulating means, a vacuum-tight enclosure between said conductors, a filament conductively connected between said conductors within said enclosure, concentric transmission line components electrically continuous with said conductors, a coupling probe at the extremity of the transmission line formed by said components, and means included in said transmission line for varying the spatial relationship between said probe and said enclosure for matching said apparatus to a high frequency power source the power output of which is to be measured.

EDWARD L. STREMPEL.
JAMES E. BEGGS.
HARRY W. A. CHALBERG.

REFERENCES CITED

The following references are of record in the file of this patent:

UNITED STATES PATENTS

| Number | Name | Date |
| --- | --- | --- |
| 2,393,711 | Schwarze | Jan. 29, 1946 |
| 2,401,637 | Harries | June 4, 1946 |
| 2,337,612 | Linder | Dec. 28, 1943 |
| 2,309,966 | Litton | Feb. 2, 1943 |
| 2,304,186 | Litton | Dec. 8, 1942 |
| 2,191,271 | Carter | Feb. 20, 1940 |
| 2,106,713 | Bowen | Feb. 1, 1938 |
| 2,311,520 | Clifford | Feb. 16, 1943 |
| 1,712,996 | Hoffman | May 14, 1929 |

OTHER REFERENCES

Article by L. S. Nergaard, pages 294–333, "Radio at ultra-high frequencies," published April 1940, by R. C. A. Institutes Tech. Press, New York city. (Reprinted from R. C. A. Review for Oct. 1938) Copy in Div. 54.